(12) United States Patent
Boldyrev et al.

(10) Patent No.: US 8,447,974 B2
(45) Date of Patent: May 21, 2013

(54) METHOD AND APPARATUS FOR MANAGING ACCESS RIGHTS TO INFORMATION SPACES

(75) Inventors: Sergey Boldyrev, Söderkulla (FI); Ian Justin Oliver, Söderkulla (FI); Jari-Jukka Harald Kaaja, Järvenp ää (FI); Joni Jorma Marius Jantunen, Helsinki (FI); Jarmo Tapani Arponen, Espoo (FI)

(73) Assignee: Nokia Corporation, Espoo (FI)

( * ) Notice: Subject to any disclaimer, the term of this patent is extended or adjusted under 35 U.S.C. 154(b) by 473 days.

(21) Appl. No.: 12/621,844

(22) Filed: Nov. 19, 2009

(65) Prior Publication Data

US 2011/0119486 A1    May 19, 2011

(51) Int. Cl.
    *H04L 29/06*    (2006.01)
(52) U.S. Cl.
    USPC ........... 713/165; 713/167; 713/176; 713/177; 713/185; 726/26; 726/27; 726/5; 726/2; 726/18; 726/17; 726/19; 717/171; 717/172; 455/3.01; 455/411; 455/418; 707/716; 707/783; 707/784; 707/785; 707/781; 707/782
(58) Field of Classification Search
    USPC ........................................................ 713/176
    See application file for complete search history.

(56) References Cited

U.S. PATENT DOCUMENTS

| | | | |
|---|---|---|---|
| 7,191,195 B2 | 3/2007 | Koyama et al. | |
| 7,357,313 B2 | 4/2008 | Uchiyama et al. | |
| 7,434,250 B2 | 10/2008 | Girard et al. | |
| 2002/0091693 A1 | 7/2002 | Ueda | |
| 2005/0262350 A1* | 11/2005 | Boutant et al. | ................ 713/176 |
| 2007/0008131 A1* | 1/2007 | Doan et al. | ................. 340/572.1 |
| 2007/0189303 A1 | 8/2007 | Sunada | |
| 2008/0010674 A1* | 1/2008 | Lee | ................................... 726/7 |
| 2008/0120727 A1* | 5/2008 | Lee et al. | ........................ 726/30 |
| 2008/0222694 A1 | 9/2008 | Nakae | |
| 2009/0044283 A1 | 2/2009 | Yoshihama | |

FOREIGN PATENT DOCUMENTS

| | | |
|---|---|---|
| CN | 101420696 A | 4/2009 |
| FR | 2915606 A | 10/2008 |
| JP | 2001134669 A2 | 5/2001 |

* cited by examiner

*Primary Examiner* — Nathan Flynn
*Assistant Examiner* — Bryan Wright
(74) *Attorney, Agent, or Firm* — Ditthavong Mori & Steiner, P.C.

(57) ABSTRACT

An approach is provided for managing access rights of users to information spaces using signatures stored in a memory tag. A signature manager caused reading of a memory tag to initiate a request, from a device, for an initial access to an information space. The request includes an authorization signature associated with the device. The signature manager determines a level of access to the information space by comparing the authorization signature against a lattice of signature primitives associated with the information space. The signature manager then modifies the authorization signature based on the determination and stores the modified authorization signature for validation of subsequent access to the information space by the device.

20 Claims, 8 Drawing Sheets

METHOD AND APPARATUS FOR MANAGING ACCESS RIGHTS TO INFORMATION SPACES

BACKGROUND

Mobile devices with various methods of connectivity are now for many people becoming the primary gateway to the internet and also a major storage point for personal information. This is in addition to the normal range of personal computers, servers, applications, services, and the like that cater to information storage and processing. As part of this trend, service providers and device manufacturers are combining and providing interoperability among these myriad information processing devices, applications, and services. More specifically, one area of development has been the processing of information through numerous, individual and personal spaces in which persons, groups of persons, etc. can place, share, interact and manipulate webs of information with their own locally agreed semantics without necessarily conforming to an unobtainable, global whole. These information spaces, often referred to as smart spaces, are projections of the 'Giant Global Graph' in which one can apply semantics and reasoning at a local level. However, the heterogeneity of available information, providers of the information, and users of the information create significant technical challenges for managing and enforcing access rights to information contained in the information spaces.

SOME EXAMPLE EMBODIMENTS

Therefore, there is a need for an approach for providing reliably managing and enforcing access rights to an information space or group of information spaces.

According to one embodiment, a method comprises causing, at least in part, reading of a memory tag to initiate a request, from a device, for an initial access to an information space. The request includes an authorization signature associated with the device. The method also comprises determining a level of access to the information space by comparing the authorization signature against a lattice of signature primitives associated with the information space. The method further comprises modifying the authorization signature based on the determination. The method further comprises causing, at least in part, storage of the modified authorization signature.

According to another embodiment, an apparatus comprising at least one processor, and at least one memory including computer program code, the at least one memory and the computer program code configured to, with the at least one processor, cause, at least in part, the apparatus to read a memory tag to initiate a request, from a device, for an initial access to an information space. The request includes an authorization signature associated with the device. The apparatus is also caused to determine a level of access to the information space by comparing the authorization signature against a lattice of signature primitives associated with the information space. The apparatus is further caused to modify the authorization signature based on the determination. The apparatus further causes storage of the modified authorization signature.

According to another embodiment, a computer-readable storage medium carrying one or more sequences of one or more instructions which, when executed by one or more processors, cause, at least in part, an apparatus to read a memory tag to initiate a request, from a device, for an initial access to an information space. The request includes an authorization signature associated with the device. The apparatus is also caused to determine a level of access to the information space by comparing the authorization signature against a lattice of signature primitives associated with the information space. The apparatus is further caused to modify the authorization signature based on the determination. The apparatus further causes storage of the modified authorization signature.

According to yet another embodiment, an apparatus comprises means for causing, at least in part, reading of a memory tag to initiate a request, from a device, for an initial access to an information space. The request includes an authorization signature associated with the device. The apparatus also comprises means for determining a level of access to the information space by comparing the authorization signature against a lattice of signature primitives associated with the information space. The apparatus further comprises means for modifying the authorization signature based on the determination. The apparatus further comprises means for causing, at least in part, storage of the modified authorization signature.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for managing access rights for an information space infrastructure are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term information space or smart space can be considered as an information set aggregated from a variety of different and distributed sources. The multi-sourcing of information gives an information space great flexibility and accounts for the fact that the same piece of information can come from different sources and different owners. Although various embodiments are described with respect to information spaces, it is contemplated that the approach described herein may be used with other distributed information sets.

Figure 1:
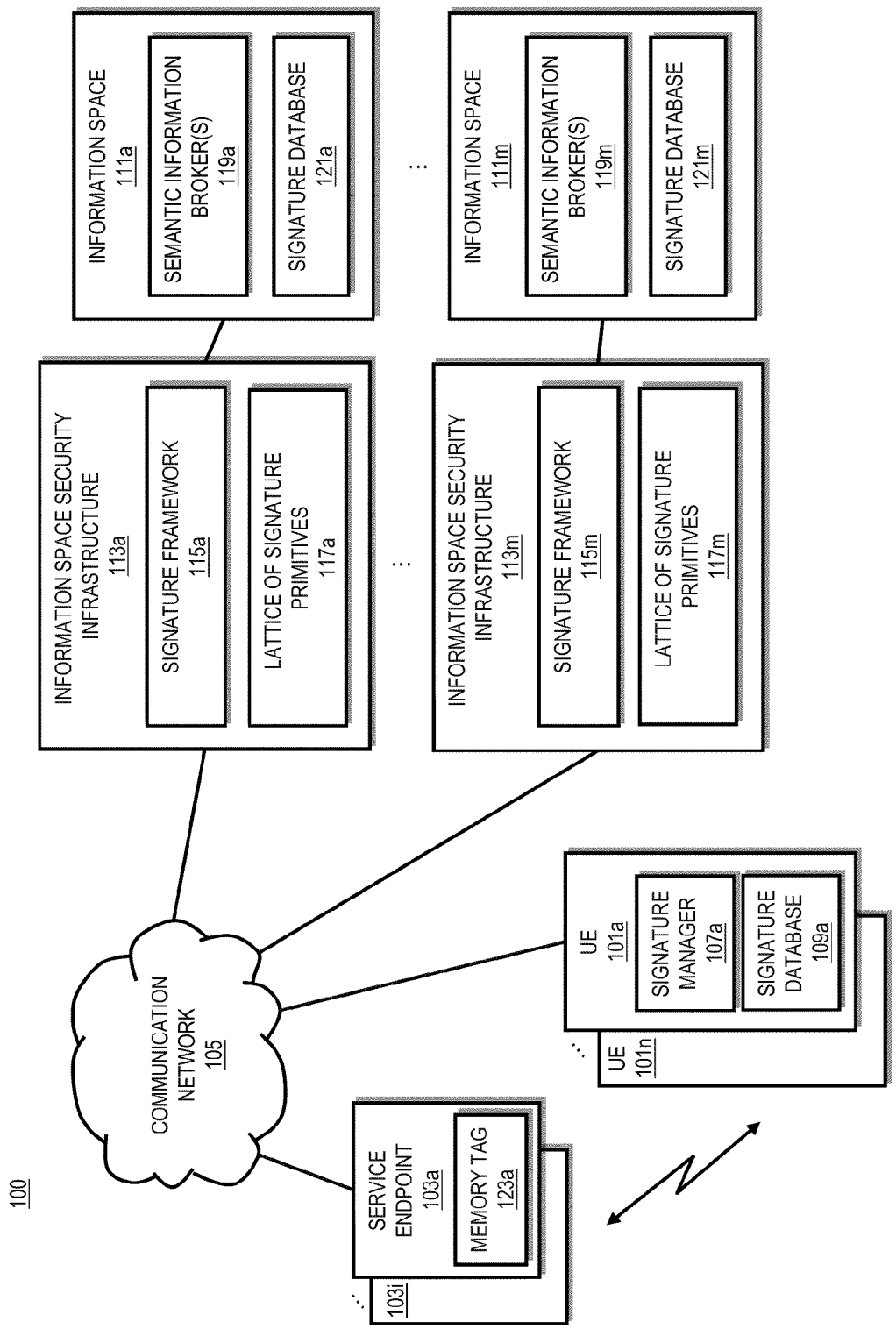
FIG. 1 is a diagram of a system capable of managing information space access rights, according to one embodiment.

FIG. 1 is a diagram of a system capable of managing information space access rights, according to one embodiment. As more information is made available over networked computer systems, service providers are becoming increasingly sensitive to information security and prevention of unauthorized access to the information (e.g., information stored in information spaces). For example, due to the distributed nature of information spaces, information with common ownership may be scattered over several sources in different localities and on various media, from mobile devices to personal computers and other web sources. At the same time one medium may have information belonging to different owners and with various levels of security requirements. Although these characteristics provide information spaces with great flexibility in terms of the storage and distribution of a variety of information, the characteristics also make it very challenging to control information security and prevent unauthorized access to the information in a way that does not place undue burden on the user. For example, if the information security process is too onerous or burdensome, users may be discouraged from relying on information spaces altogether.

To address this problem, a system 100 of FIG. 1 introduces the capability to manage access rights to information spaces based on a security infrastructure that relies on a signature framework employing memory tags (e.g., a radio frequency identification (RFID) memory tag, high capacity RF memory tag, passive RF memory tags, active RF memory tags, etc.). In one embodiment, a service endpoint acts as a gatekeeper to the content in one or more corresponding information spaces by employing the security infrastructure to ensure that only authorized users have access to the content. By way of example, the service endpoint stores access or authorization signature information using a memory tag infrastructure. A population of RF memory tags can form the service endpoint. Thus, the signatures can be stored among the population by scattering copies of collaborating agents to the tags. An agent can be a pointer or a process that runs on memory tags and on a memory tag reader to provide positional knowledge to enhance collaboration in managing access rights to information spaces. In particular, managing security of an information space involves various operations such as granting or denying access to the information for a user, verifying user's level of access authority, adding or removing a user from authorized list, enforcing security policies and time management of user access to information, etc.

Under the scenario of FIG. 1, the system 100 includes user equipment (UEs) 101a-101n having connectivity to one or more information spaces 111a-111m via a communication network 105. Additionally, the UE 101 can communicate with one or more service endpoints 103a-103i via wireless or a wired communication. The service endpoint 103 can have access to the information space 111 via the communication network 105 or can be operated in a solitary or stand-alone mode of operation. In one embodiment, the information spaces 111a-111m can include content such as music, video, other media, applications, games, or the like that can be bought, subscribed to, or consumed for free. The UE 101 can utilize a content application (not shown) to access information spaces 111a-111m. The UE 101 can also utilize a signature manager 107 to gain authorized access to the information. The service endpoint 103a can utilize a RF memory tag 123 to store signature information as well as transmit such information to a UE 101. The UE 101 may include one or more readers capable of reading the RF memory tags 123.

By way of example, radio frequency technologies are short range wireless communication technologies that enable the exchange of data between devices over short distances (e.g., a range of 4 inches to 3 yards). In general, these technologies comprise two primary components, a tag (e.g., attached to an object or service endpoint 103) and a reader (which can be implemented with the UEs 101a-101n). Communication between the reader and the tags occur wirelessly and may not require a line of sight between the devices. The tag is, for instance a small microchip that is attached to an antenna. The tags can vary in sizes, shapes, and forms and can be read through many types of materials.

Moreover, the tags may be passive tags or active tags. Passive tags are generally smaller, lighter, and less expensive than active tags. Passive tags are activated when within the response range of a reader. The reader emits a low-power radio wave field that is used to power the tag so as to pass on any information that is contained on the chip. Some passive tags operate, e.g., below a 100 MHz frequency and the main transfer energy is carried by a magnetic field. A magnetic field can generate voltage in an antenna coil that can be used as a power supply. Additionally, high frequency passive tags that operate at, e.g., 900 MHz and 2.45 GHz ranges can be used. These high frequency tags can support a faster data stream (e.g., 1.6 Mb/s or 2 Mb/s data streams). In one example, two signals are transmitted by the reader, a power signal and a data signal.

Active tags differ in that the tags incorporate their own power source to transmit rather than reflect radio frequency signals. Accordingly, active tags enable a broader range of functionality like programmable and read/write capabilities.

In one embodiment, the memory tag may receive updates such as security updates, content updates, application updates, signature termination/cancellation, etc. or request for such updates as a condition when signatures are read by a UE 101 from the memory tag. By way of example, on reading a memory tag, the UE 101a may automatically contact the information owner (e.g., a content provider service) over the communication network 105 to determine whether there are updates to the information in the memory tag. If there are updates, the UE 101a retrieves the updates from the content provider service and uses the updated information in place of the information (e.g., signatures) read from the memory tag. In certain embodiments, the memory tag (e.g., an active memory tag) may be writable. In this case, the UE 101a may update the information on the memory tag with information retrieved from the information owner. In this way, other UEs 101a-101n subsequently reading the memory tag can obtain up-to-date information even if they do not have connection to the information owner over the network 105 (e.g., have no data connection).

By way of example, signature updates can be performed automatically by the UE 101 associated with the owner of the information. In addition or alternatively, other UEs 101a-101n (e.g., those not associated with the owner) may also initiate update with certain restrictions. More specifically, depending on the access rights that the other UEs 101a-101n may have with respect to the information in the memory tag, the other UEs 101*a*-101*n* may be used as secure conduits for updating, but a user of the UEs 101*a*-101*n* would not be able to access or view the updates or other information read or written to the memory tag without authorization. This can ensure that connections between memory tags and the information owner (e.g., the information space security infrastructure 113*a*-113*m*) occurs as often as possible since memory tags (e.g., passive memory tags) do not have active wireless connection available due to their limited resources. In some embodiments, information in the memory tag or updates to the memory tag may be encrypted to prevent unauthorized access.

A memory tag is accessed by a read/write device generally referred to as a reader. A reader typically contains a transmitter, receiver, control unit, and an antenna. The reader performs three primary functions when reading a tag: energizing the tag, demodulating and decoding the returned radio signal. In certain embodiments, a reader includes an additional interface to convert the returned radio signal to a form that can be passed to another system such as a computer or programmable logic controller. Writing on a memory tag involves similar functions such as modulating and encoding the data into an appropriate format before it is written on the tag.

In one embodiment, the memory tags of the system 100 may employ or be part of a communication protocol/system (e.g., the Micro-Nano integrated platform for transverse Ambient Intelligence applications (MINAmI) Project) for providing high data rate communication between a reader/writer device and large memory containing radio frequency (RF) tags operating over a very high data rate communication channel. This system can support advanced memory-tag functions and capabilities. For example, such a system can be embedded in the physical environment and in everyday objects to provide rich information regarding the environment and objects. The information can be anything from sensor measurements from the environment or the user itself, to a piece of music or the latest news. The user can wirelessly access this information content by just touching or scanning close tags and sensors with an apparatus capable of reading the tags (e.g., an RF-reader equipped handset). The information in these memory tags may be based on an information space architecture where any number and types of devices may be used to view and access memory tag information. Information spaces or smart spaces also may provide a better user experience by allowing the user to bring in new devices flexibly and to access all of the information from any of the devices.

In one embodiment, a UE 101 can access (e.g., purchase, request, order, etc.) content from an information space 111 via the communication network 105. The UE 101 (e.g., a personal computer or mobile device) can access the content for the UE 101 itself or for another UE 101 (e.g., a mobile device). The UE 101 can then, for instance, synchronize with the information space 111 to obtain agents that can be used to retrieve the content from a service endpoint 103. In some embodiments, the service endpoint 103 already has some of the content preloaded. In other embodiments, the service endpoint 103 is sent the content from the information space 111 after the order is completed. In this embodiment, the information space 111 can send the UE 101 availability information that informs the UE 101 of when the information will be available on the information space 111. In one example, the UE 101 can retrieve the content from one of many service endpoints 103. In this example, the content can be common to multiple service endpoints 103, thus not requiring data to be transmitted from an information space 111 to a service endpoint 103. A user can check to see if a particular static service endpoint 103 (e.g., one without a connection to an information space 111) has the specific content (e.g. list of new songs, movies, etc.). To receive the content, the UE 101 can then retrieve location and/or authentication information for the content from multiple service endpoints 103.

In another embodiment, a UE 101 may have access rights to multiple information spaces 111*a*-111*m* each having different access right restrictions. In this scenario, the UE 101 may have access to multiple service endpoints 103*a*-103*i* that can be associated multiple information spaces 111*a*-111*m*. Each service endpoint 103 than may handle and/or enforce access right restrictions specific to the policies of the respective information space 111. In many cases, these policies can differ from information space 111 to information space 111.

In another embodiment, an information space 111 may have been created on a temporary basis. By way of example, temporary information spaces may be used for events or activities occurring over a limited period of time (e.g. special offers for equipment sale during a certain sale period), for restricted use in a specific physical locality (e.g. for copyright reasons), or with dependency on one or more other information spaces (e.g. special offers information space needs to be accessible as long as the inventory of on-sale equipment lasts). These restrictions mean that the information space may not be accessible before or after the designated time period, outside the designated area, or in the absence of one or more other information spaces. In this embodiment, access right restrictions may include: (1) start and end of accessible periods; (2) limits or boundaries of one or more geographical zones where the information is accessible; (3) information regarding the information spaces which the information space's existence depend on; and the like.

A signature can be synthesized from either an information stream or any query imposed against such information including particular cases of queries such as subscription. A signature primitive provided by a memory tag 123 or from a device through network is used as the basic signature. Subsequently, every time an end user provides a signature in order to gain access to one or more information spaces the validity of the signature, the level of its authority and the level of access granted to the signature is stored together with the signature in the signature database 121. In one embodiment, the basic signature or signature primitive is modified to include information specific to the level of access or authority a user has with respect to an information space. This modified signature is then stored as a new authorization signature that can be synchronized across the security infrastructure of the information space 111. The process of signature synchronization conducted by signature framework 115 synchronizes the contents of signature database 121 with the content of signature database 109 to ensure accuracy.

The authorization signature for a user can be synthesized by an authorized entity such as a trusted service or by a user or delegated entity. Therefore, the signature can be downloaded from a web service, a service endpoint or from a delegated entity to a device that has the necessary signature infrastructure in order to gain the access to the particular information set within information space environment.

As described previously, the UEs 101*a*-101*n* have connectivity to information space security infrastructures 113*a*-113*m* via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UEs 101a-101n are any type of mobile terminals, fixed terminals, or portable terminals including mobile handsets, stations, units, devices, multimedia computers, multimedia tablets, Internet nodes, communicators, desktop computers, laptop computers, Personal Digital Assistants (PDAs), or any combination thereof. It is also contemplated that the UEs 101a-101n can support any type of interface to the user (such as "wearable" circuitry, etc.).

In one embodiment, an information space includes signed information sets with signatures from information owners, managers or any other authority (e.g., a trusted third party). The creation of the signed information offers the possibilities to find the qualitative properties of the information and to maintain the initially given credentials in a secured format as signatures. The utilization of signatures delivers manageable security infrastructure of the information space content information, especially in highly evolving distributed memory tags and information space environments. Each of the UE 101a-101n may have their own respective signature manager 107a-107n and signature databases 109a-109n for storing signatures and corresponding semantic information.

The UEs 101a-101n contain respectively signature manager applications 107a-107n that control corresponding signature databases 109a-109n which contain a list of signatures attached to the UEs 101a-101n. The first time a UE 101 comes to a close proximity of a service endpoint 103 including a memory tag 123, the signature manager 107 reads an authorization signature stored on the memory tag 123 and stores the signature in signature database 109. In one embodiment, the service endpoint 103 may display a list of information spaces accessible by the authorization signature. In another embodiment, the service endpoint may redirect the UE to information space security infrastructure 113 for accessible information spaces, and the signature framework 115 initiates display of the accessible information on the UE screen. The information space security infrastructure 113 verifies access authority and the level of authority of the UE 101 based on the authorization signature read from the memory tag 123. The user interface (UI) of the UE 101 can display the available information space environments that are not yet accessed (e.g., information spaces that are still sealed because a valid signature has yet to be applied) in a way that allows users to see them, but not to access them. If the end user tries to access an information space, the signature manager 107a-107n notifies the user to supply a corresponding authorization signature obtained from the memory tag 123 or from the signature database 109.

According to the approach described herein, each information space 111a-111m has connectivity to an information space security infrastructure 113a-113m that manages access to the content of information space. All the information sets within information spaces 111a-111m are optionally signed by authorized (trusted) entities and delivered to the signature framework 115a-115m either through off-the-band sales points or by web service provider(s). The authorized signatures for each information space 111a-111m is checked by information space signature infrastructure 113a-113m in order to detect any disparity between the information space specific signature infrastructure and run-time (user) signature from signature database 109a-109n. The very first usage of a signature which corresponds with the first attempt by a UE 101a-101n to access an information space 111a-111m is considered by the security infrastructure 113a-113m as an initial access step regardless of whether the access is granted or denied. The user signature is locally updated in the signature database 109a-109n of the UE 101a-101n based on the initial access.

The signature framework 115 is designed so that the originally synthesized signatures are created according to the predetermined policies and distributed information sets around one particular information space. The signature updating mechanism used by signature framework 115 modifies an original signature (e.g., the signature primitive read from the memory tag 123) in order to reflect the state of every access by a UE 101a-101n, e.g., whether the access was granted, denied, or otherwise restricted.

In one embodiment, a list of signatures initially produced by authorized entities for an information space is stored and maintained in the lattice of signature primitives 117a-117m of the information space. This lattice of signature primitives 117a-117m may then be used to authenticate the authorization signatures presented by the UE 101 during, for instance, an initial access request.

By way of example, the initial attempt by a UE 101a-101n to access an information space 111a-111m triggers the signature framework 115a-115m to verify whether the access is according to predetermined policies referred to as Smart Space Access Protocol (SSAP). A signature may include information regarding predefined regulations to determine the scope and level of visibility of the information that can result in full access or restricted access to the information space or one or more information sets within the information space or their subsets.

If the UE 101 provides an authorization signature which is according to the corresponding SSAP, this access is considered as a positive access, meaning that access to the information is granted to the UE 101. Otherwise, if the initial access is a negative access, meaning that the signature is unauthorized and the access is denied or restricted, the information space security infrastructure 113a-113m initiates a sealing process of the particular information set within information space or the whole information space in order to protect information from unauthorized access. The corresponding process of sealing is performed on the physical or logical entity (e.g., the UE 101) that generated the negative initial access. This can be driven by, for example, a mobile device locking mechanism. This mechanism is equally applicable to symmetric distribution of information (e.g., distribution of information with common ownership or provenance) and asymmetric distribution of information (e.g., distribution of information with different ownership or provenance) among information space components.

By way of example, the UE 101a-101n, communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
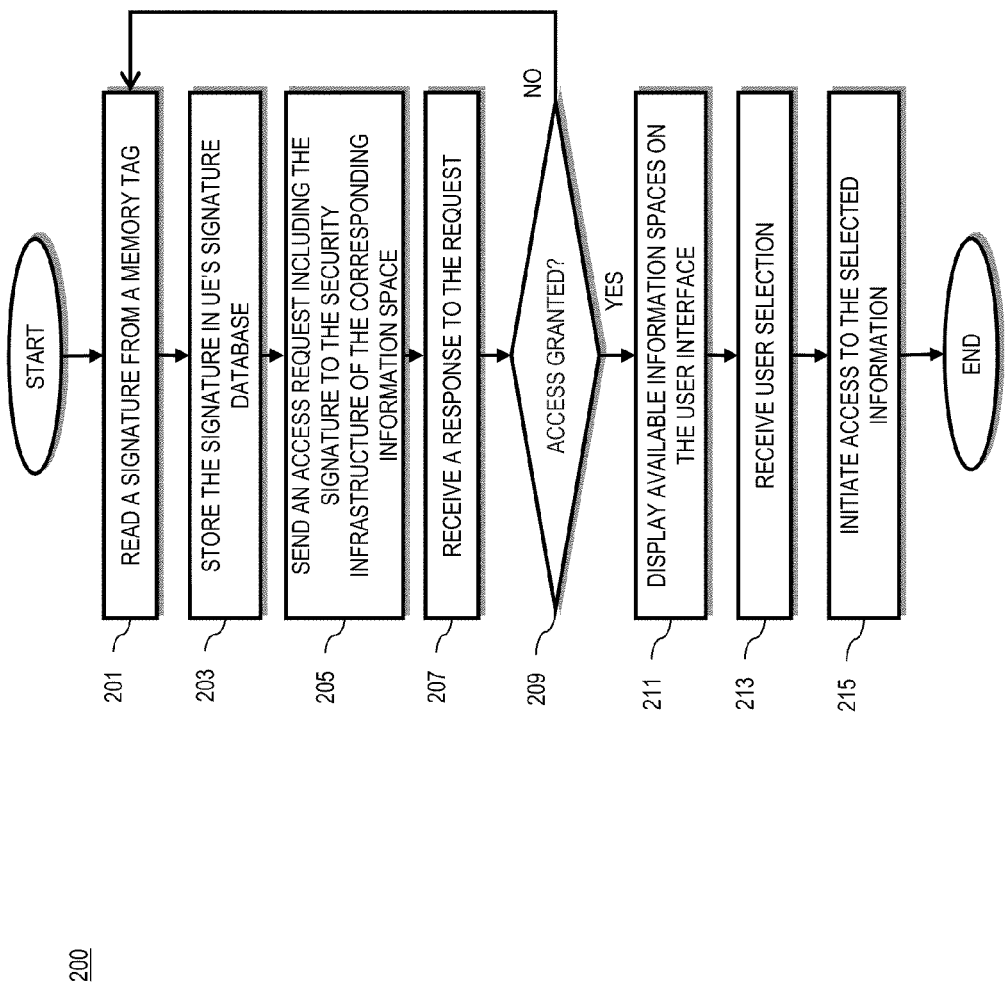
FIG. 2 is a flowchart of a process for initiating access to an information space, according to one embodiment.
Figure 7:
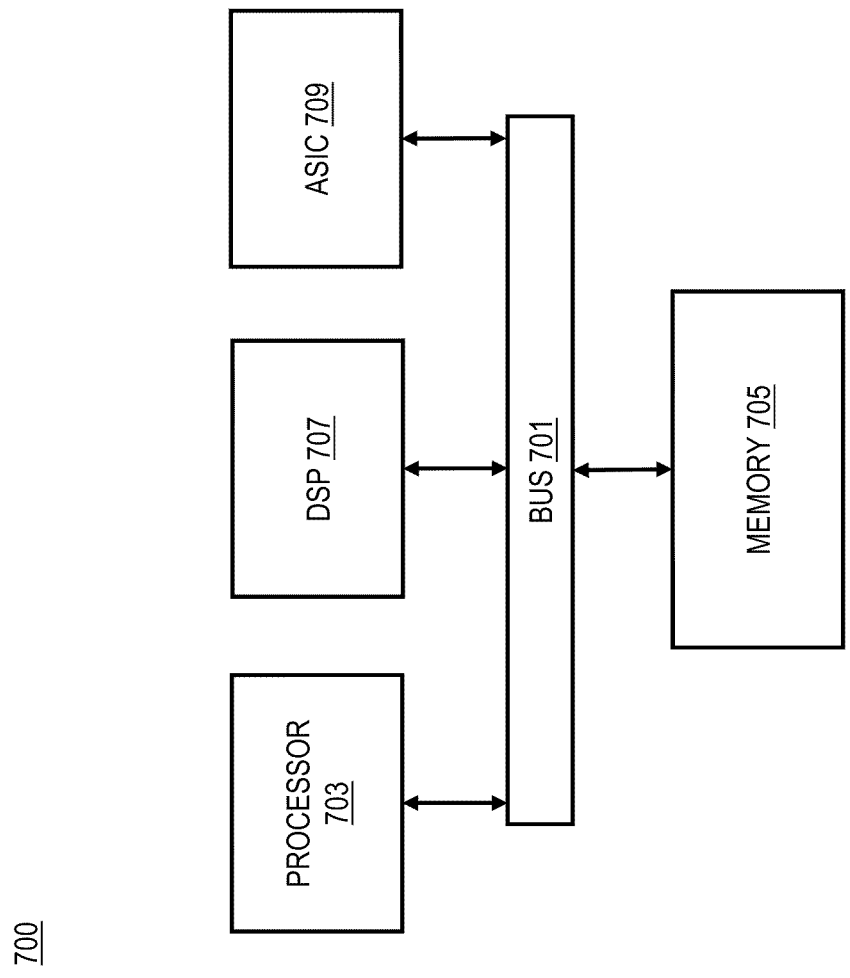
FIG. 7 is a diagram of a chip set that can be used to implement an embodiment of the invention.

FIG. 2 is a flowchart of a process for initiating access to an information space by a user, according to one embodiment. In one embodiment, the signature manager 107 performs the process 200 and is implemented in, for instance, a chip set including a processor and a memory as shown in FIG. 7. In the example of FIG. 2, a memory tag capable mobile phones or other memory tag compliant UE 101 gains access to an information space 111 bringing the device within close proximity a memory tag 123 containing an authorization signature. In step 201, the signature manager 107 of UE 101 reads an authorization signature from a memory tag 123 that is in proximity to the UE 101. The authorization signature, for instance, grants access to a particular information space 111. The signature manager 107 then stores the signature into signature database 109 (step 203) before starting an attempt to communicate with the information space 111 corresponding to the signature (step 205). For example, information about one or more information spaces accessible by the signature is included in the signature. In step 207, the signature manager 107 receives a response from information space security infrastructure 113 regarding the access request. The signature manager 107 then determines whether the response has granted access (step 209). If the access is denied, the signature manager 107 may try to read another signature, read the same signature again, or end the process. Access may be denied, for instance, if the information space security infrastructure 113 cannot match the signature against its lattice of signature primitives 117. If the signature is valid and access to information is granted to the UE 101, the signature manager 107 receives an authorization message from the information space security infrastructure including a list of available information spaces and the corresponding level of access for the specific UE 101. In step 211, the signature manager 107 displays the list on a user interface of the UE 101 for selection of the desired information. After a user enters a selection, the signature manager 107 receives the user entry (step 213). By way of example, the user may enter a selection using a keypad, touching the screen to activate a touch-enabled control button, initiating voice recognition, or any other input method supported by the UE 101. In step 215, the signature manager 107 initiates access to the selected information space using the received authorization.

In a situation where a signature is not presented by a user at the user's first attempt to access an information space, the information space security infrastructure 113 does not allow access or will notify the user that only restricted access is possible. Access to the information space will be permanently available on a device only after a memory tag 123 containing the necessary signature is read to acknowledge and grant access to the information space 111. In one embodiment, access is granted to the information via a join command.

Each memory tag 123 contains a signature tailored for the full and restricted purposes in, for instance, a region of the memory tag 123 that is protected from normal writing. The memory tag software (e.g., the signature manager 107) that exists on the UE 101 reads the signature from the memory tag 123. Thereafter, the signature manager 107a-107n of the UE 101a-101n updates the signature using the contents of signature database 109a-109n so that no other device may be able to use the signature with full access. When a memory tag with a signature is read by another UE 101, the other UE 101 will either be only served with restricted access to the information space or a service would be denied altogether, meaning that the information space will remain sealed for this specific UE 101.

In a similar fashion, any information space application provided by a software vendor and installed on a UE 101 can be optionally signed (e.g., within a signature infrastructure) so that it cannot be taken off of the UE 101 for backwards engineering and breaking of the signature or license key mechanism. This signing will also prevent the information space application from being tampered by a malicious third party. For pre-installed information space applications, the signature manager 107a-107n prevents execution of the information space application until an authorization signature is presented.

Figure 3:
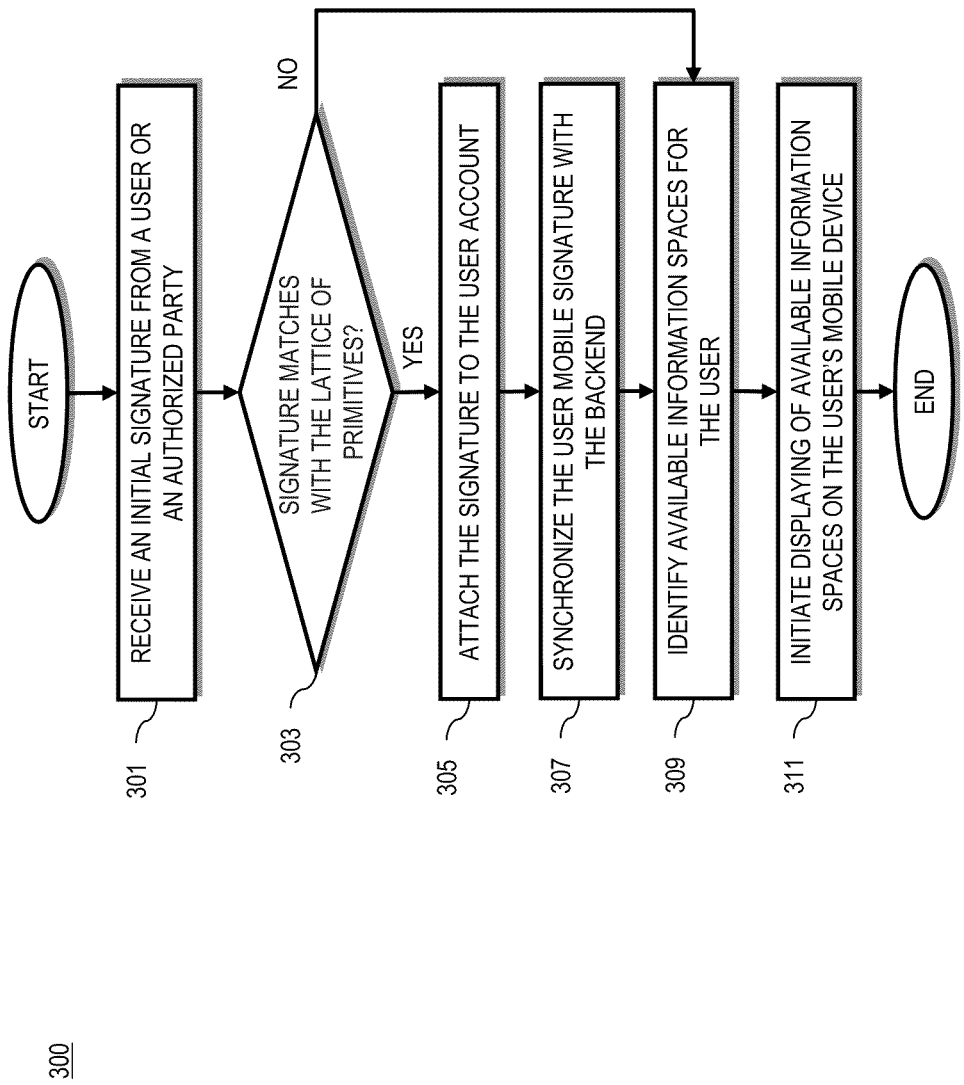
FIG. 3 is a flowchart of a process for creating authorization profile for a user of information space, according to one embodiment.

FIG. 3 is a flowchart of a process for creating authorization profile for a user of information space, according to one embodiment. In one embodiment, the information space security infrastructure 113a-113m performs the process 300 and is implemented in, for instance, a chip set including a processor and a memory as shown FIG. 7. In step 301, the information space security infrastructure 113a-113m receives an initial signature. For example, this means that this is the first time a signature for a certain user is being introduced. The user may have obtained the signature by using the UE 101 to read the signature from a memory tag. The signature may then be sent by the user through the UE 101. Alternatively, another authorized party can send the signature on behalf of the user. For example, if the user is not the owner of the information space 111 but has been given permission by the owner (e.g., a friend) to access the information space 111, the owner may initialize and generate a signature in order to authorize the user to access the information space 111. In step 303, the information space security infrastructure 113 checks whether the signature exists in the lattice of signature primitives 117 for the specific information space 111. If the signature does not exist in the lattice 117, the information space security infrastructure 113 considers the signature to be not valid. In this case, the information space security infrastructure 113 may still provide the user with some information such as a list of available information, advertisements etc. The process then continues from step 309 where the information space security infrastructure 113 determines the information that can be provided or displayed on the UE 101 and, in step 311, initiates display of the information in a user interface of the UE 101.

If the signature matches with the content of the lattice of signature primitives 117 (step 305), the information space security infrastructure 113 attaches the signature to the user account, if the account already exists, or creates the account for a first time user and stores the signature in the user's account. A user may already have an account through accessing information spaces other than the one they are trying to access for the first time or may have accessed the same information space 111 with a different level of authority. The information space security infrastructure 113 also adds or synchronizes the new signature to the signature database 121 for the information space 111. In step 307, the information space security infrastructure 113 synchronizes the signature database 109 in the UE 101 with the user's signature stored in the signature database 121 of the information space 111. In cases where the signature is generated by an authorized party other than the user, the synchronization of step 305 stores the signature in the signature database 109 of the UE 101. In step 309, the information space security infrastructure 113 identifies the information spaces 111a-111m that the new signature applies to, or in other words, the information spaces that the new signature enables the user to have access to. Finally, in step 311, the information space security infrastructure 113 initiates the display of available information spaces 111a-111m on the UE 101. In one embodiment, the UE 101 is equipped with applications that enable the user to select their desired information space and/or access the corresponding content. For example, if an information space 111 may contain music, images, videos, text, etc., the UE 101 download or access the content using a media player or other application. If the UE 101 does not already have the appropriate application installed, the information space security infrastructure 113 may initiate downloading or transfer of the application to the UE 101. The type of user access and the level of restrictions that may exist on the access can be defined by the information owner. Access may also depend on the capabilities of the network 105 (e.g., available bandwidth, servers, etc.) and UE 101 features such as available memory, connection speed, etc.

Figure 4:
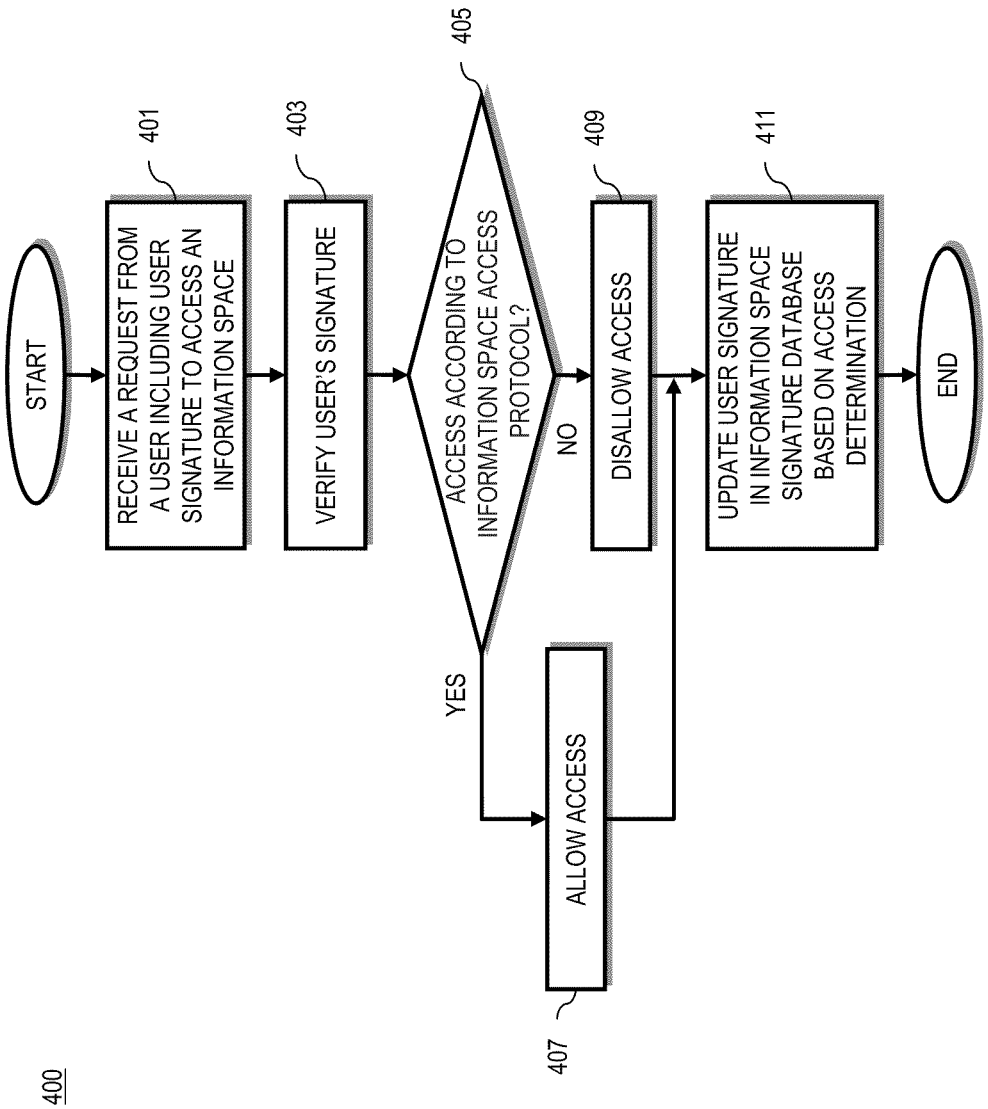
FIG. 4 is a flowchart of a process for verifying authorization of a user to access an information space, according to one embodiment.

FIG. 4 is a flowchart of a process for verifying authorization of a user to access an information space, according to one embodiment. In one embodiment, the information space security infrastructure 113 performs the process 400 and is implemented in, for instance, a chip set including a processor and a memory as shown in FIG. 7. In step 401, the information space security infrastructure 113 receives a request from a user for subsequent access (e.g., after the user has already performed the initial access as described above) to an information space 111. The request includes the user's authorization signature (e.g., modified to indicate a level of access) that has been obtained from a memory tag and stored in UE 101 signature database previously. In step 403, the information space security infrastructure 113 verifies the user's authorization signature by comparing it against the signature database 121 for the corresponding information space 111a-111m. If the user signature is legitimate (step 405), the user's authorization signature is validated, and access to the information space is granted to the user (step 407). Otherwise, if the user signature does not match with the access protocol for the information space 111, access to the information system for the user is denied or the information space is sealed for the user (step 409). In certain embodiments, if full access to the information space 111 is denied, the information space security infrastructure may provide or grant limited access. The type of limited access to grant is based, for instance, on the signature content and/or the policies of the information space 111. For example, a user may have reading rights and not writing rights of information. Another user may be able to see the latest updates or have access to a limited subset of information based on the content, date entered, etc. In step 411 the information space's signature database 121 is updated based on the latest access determination. Therefore, a history of user access to the information space is preserved in the signature database 121 for future reference.

In one embodiment, the information space security infrastructure 113 may prevent or limit access to an information space to a second UE 101b while the information space is being accessed by a first UE 101a. For example, in a situation where one or both UEs 101a-101b have the authority to update the information, the information space security infrastructure 113 may seal the information space during the updating access in order to protect consistency of information.

Figure 5:
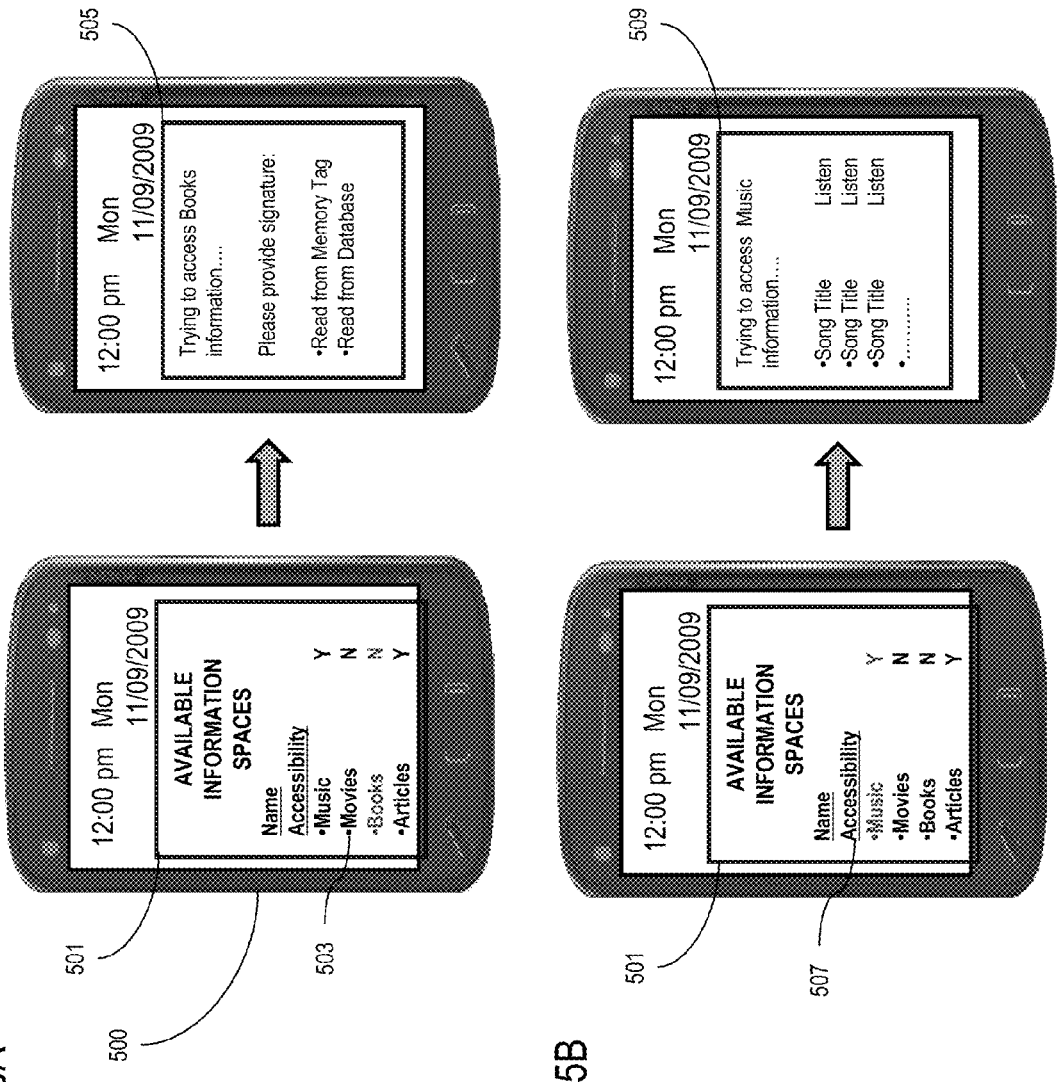
FIGS. 5A-5B are diagrams of user interfaces utilized in the processes of FIG. 3, according to various embodiments.

FIGS. 5A-5B are diagrams of user interfaces utilized in the processes of FIG. 4, according to various embodiments. In FIG. 5A, the display 501 of the UE 500 has received a list of available information spaces as described with respect to FIG. 4. The first column of the display 501 identifies the information space and the second column shows the accessibility of each information space for the UE 500. In this example, the user has access capability to Music and Articles information spaces but not to Movies and Books. If the user attempts to access Books information space 503 even though the UE 500 does not have the appropriate access rights, the information space security infrastructure 113 for the Books information space 503 searches the corresponding signature database 121 for any signatures belonging to UE 500. For example, the database 121 includes any past authorized signatures, past access attempts and whether access has been granted to the UE 500 before. As an example, the information space security infrastructure 113 of the Books information space 111 may display alert 505 on the UE 500 to request a signature from the UE 500. The information space security infrastructure may also suggest possible existing sources that the UE 500's signature can be read from and allow the user to select the source. When the user selects the proper source, the information space security infrastructure 113 reads the signature. If the signature database for information space Books has no entry indicating past access by UE 500 (e.g., this is the initial access) the information space security infrastructure 113 applies the process 300 of FIG. 3, otherwise if there are entries for the UE 500 in the signature database 121, the information space security infrastructure 113 applies the process 400 of FIG. 4 and determines access authority of UE 500 to the information space Books.

In FIG. 5B the user of UE 500 attempts to access the Music information space 507 for which the UE 500 has the appropriate level of access. In this case, the information space security infrastructure 113 reads the UE 500's authorization signature from the signature database 121 for Music information space 507 and grants access to the information space 507 accordingly.

The processes described herein for managing access rights for an information space infrastructure or a group of such spaces may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
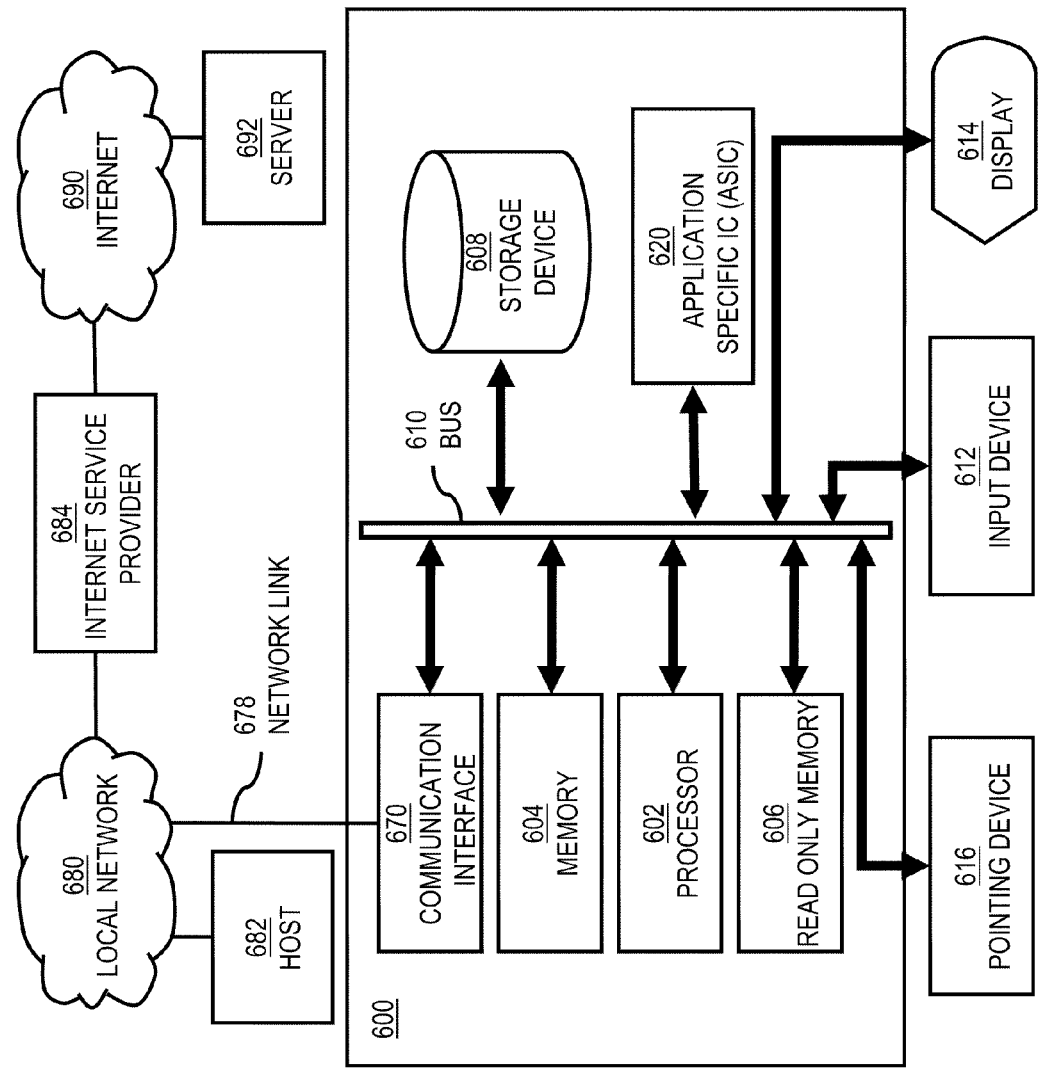
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide reliable and flexible method of managing access rights for an information space infrastructure or a group of such spaces as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing reliable and flexible method of managing access rights for an information space infrastructure or a group of such spaces A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to providing reliable and flexible method of managing access rights for an information space infrastructure or a group of such spaces. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing reliable and flexible method of managing access rights for an information space infrastructure or a group of such spaces. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing reliable and flexible method of managing access rights for an information space infrastructure or a group of such spaces, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing reliable and flexible method of managing access rights of to the UE 101a-101n for an information space infrastructure or a group of such spaces.

The term "computer-readable medium" as used herein to refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set 700 upon which an embodiment of the invention may be implemented. Chip set 700 is programmed to provide reliable and flexible method of managing access rights for an information space infrastructure or a group of such spaces as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of providing reliable and flexible method of managing access rights for an information space infrastructure or a group of such spaces.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide reliable and flexible method of managing access rights for an information space infrastructure or a group of such spaces. The memory 705 also stores the data associated with or generated by the execution of the inventive steps.

Figure 8:
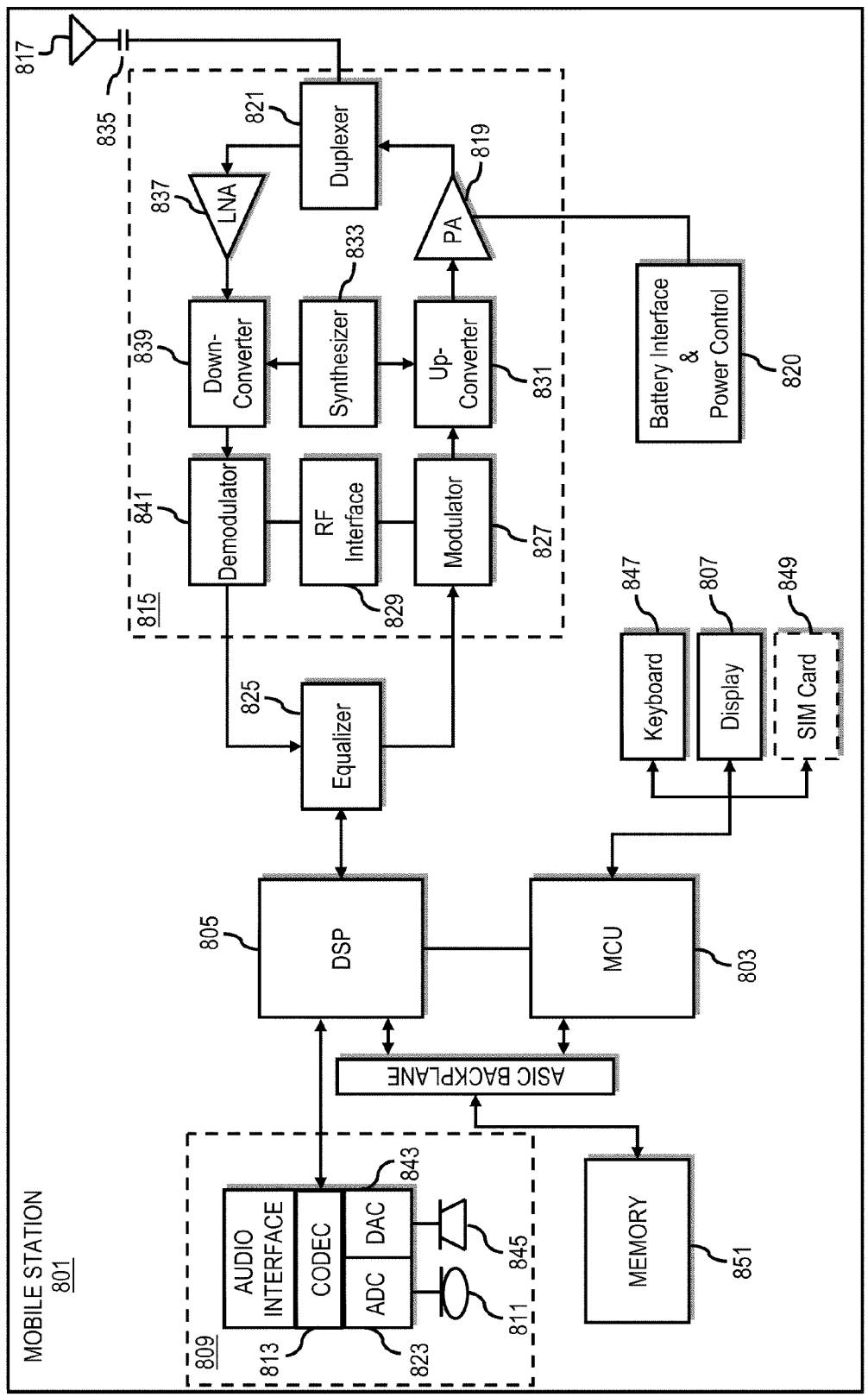
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of providing reliable and flexible method of managing access rights for an information space infrastructure or a group of such spaces. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing reliable and flexible method of managing access rights for an information space infrastructure or a group of such spaces. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide reliable and flexible method of managing access rights for an information space infrastructure or a group of such spaces. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   causing, at least in part, reading of a memory tag to initiate a request, from a device, for an initial access to an information space, the request including an authorization signature associated with the device;
   determining a level of access to the information space by comparing the authorization signature against a lattice of signature primitives associated with the information space;
   modifying the authorization signature based on the determination; and
   causing, at least in part, storage of the modified authorization signature.

2. A method of claim 1, wherein the level of access is full access or restricted access, the method further comprising:
   joining the device to the information space at the determined level of access.

3. A method of claim 1, wherein the level of access is full access or restricted access, the method further comprising:
   causing, at least in part, downloading of an application associated with the information space to the device.

4. A method of claim 1, wherein the level of access is no access, the method further comprising:
   sealing the information space against access by the device.

5. A method of claim 1, further comprising:
   preventing or limiting re-use of the authorization signature by another device.

6. A method of claim 1, further comprising:
   receiving another request, from the device, for subsequent access to the information space;
   in response to the another request, retrieving the modified authorization signature from the device;
   determining the level of access from the modified authorization signature; and
   causing, at least in part, actions that result in providing the determined level of access to the device.

7. A method of claim 1, wherein the information space is signed by an authorized entity, the method further comprising:
   detecting a disparity between a signature associated with the information space and either the authorization signature or the modified authorization signature,
   wherein the determined level of access is based, at least in part, on the detection.

8. A method of claim 1, wherein the initial access includes communication between the device and the information space, an interaction process between the device and the information space, or a combination thereof.

9. An apparatus comprising:
   at least one processor; and
   at least one memory including computer program code, the at least one memory and the computer program code configured to, with the at least one processor, cause the apparatus to perform at least the following, cause, at least in part, reading of a memory tag to initiate a request, from a device, for an initial access to an information space, the request including an authorization signature associated with the device;

determine a level of access to the information space by comparing the authorization signature against a lattice of signature primitives associated with the information space;

modify the authorization signature based on the determination; and cause, at least in part, storage of the modified authorization signature.

10. An apparatus of claim 9, wherein the level of access is full access or restricted access, and the apparatus is further caused to:

joining the device to the information space at the determined level of access.

11. An apparatus of claim 9, wherein the level of access is full access or restricted access, and the apparatus is further caused to:

cause, at least in part, downloading of an application associated with the information space to the device.

12. An apparatus of claim 9, wherein the level of access is no access, and the apparatus is further caused to:

seal the information space against access by the device.

13. An apparatus of claim 9, wherein the apparatus is further caused to:

prevent or limit re-use of the authorization signature by another device.

14. An apparatus of claim 9, wherein the apparatus is further caused to:

receive another request, from the device, for subsequent access to the information space;

in response to the another request, retrieve the modified authorization signature from the device;

determine the level of access from the modified authorization signature; and cause, at least in part, actions that result in providing the determined level of access to the device.

15. An apparatus of claim 9, wherein the information space is signed by an authorized entity, and the apparatus is further caused to:

detect a disparity between a signature associated with the information space and either the authorization signature or the modified authorization signature, wherein the determined level of access is based, at least in part, on the detection.

16. An apparatus of claim 9, wherein the initial access includes communication between the device and the information space, an interaction process between the device and the information space, or a combination thereof.

17. An apparatus of claim 9, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

18. A non-transitory computer-readable storage medium carrying one or more sequences of one or more instructions which, when executed by one or more processors, cause an apparatus to at least perform the following steps:

causing, at least in part, reading of a memory tag to initiate a request, from a device, for an initial access to an information space, the request including an authorization signature associated with the device;

determining a level of access to the information space by comparing the authorization signature against a lattice of signature primitives associated with the information space;

modifying the authorization signature based on the determination; and causing, at least in part, storage of the modified authorization signature.

19. A non-transitory computer-readable storage medium of claim 18, wherein the apparatus is caused to further perform:

receiving another request, from the device, for subsequent access to the information space;

in response to the another request, retrieving the modified authorization signature from the device;

determining the level of access from the modified authorization signature; and causing, at least in part, actions that result in providing the determined level of access to the device.

20. A non-transitory computer-readable storage medium of claim 19, wherein the information space is signed by an authorized entity, and the apparatus is caused to further perform:

detecting a disparity between a signature associated with the information space and either the authorization signature or the modified authorization signature, wherein the determined level of access is based, at least in part, on the detection.

* * * * *